Patented June 3, 1924.

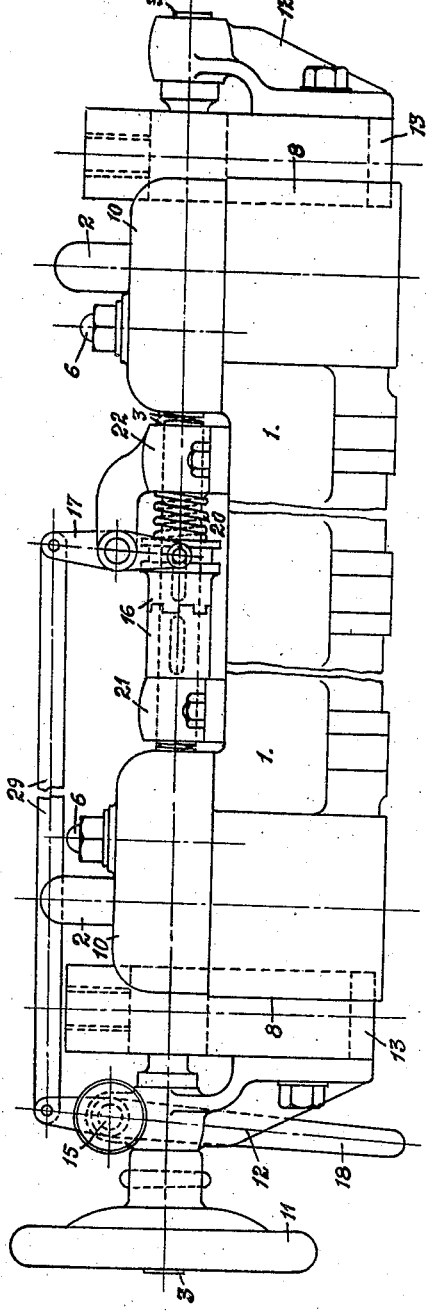

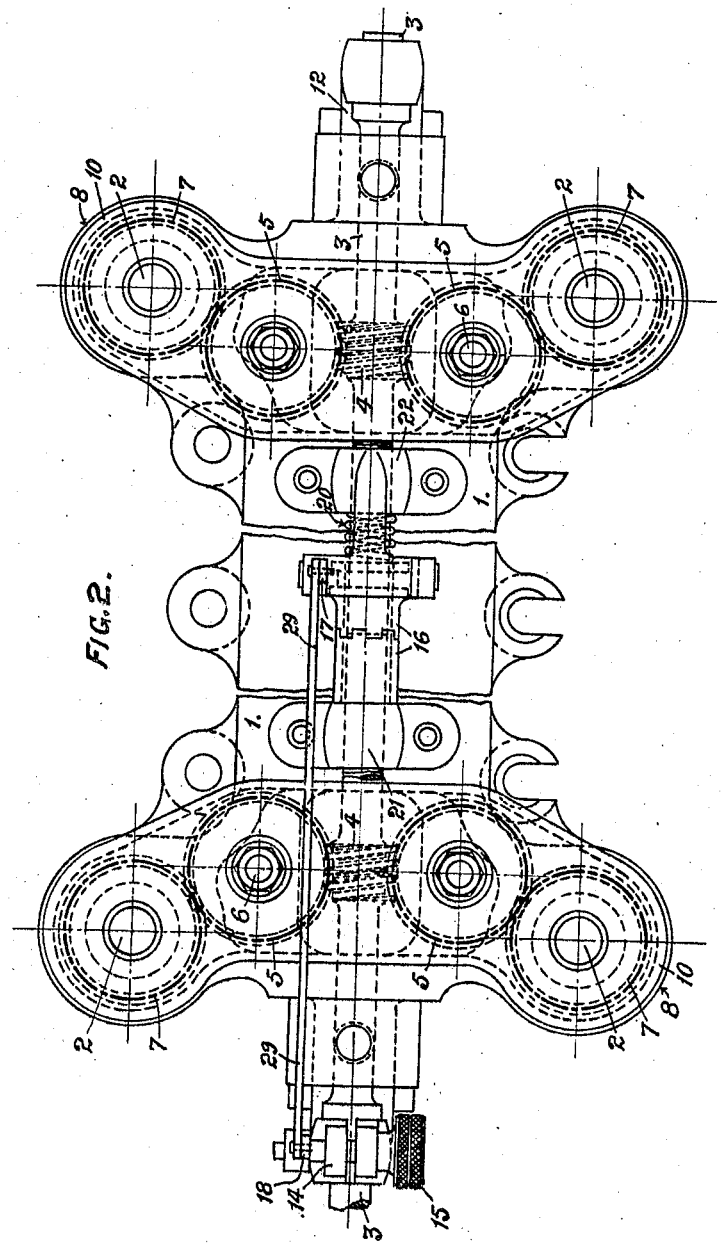

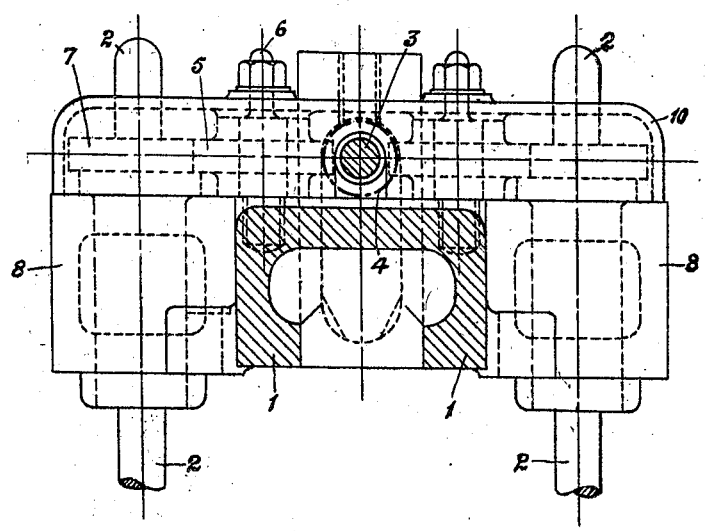

UNITED STATES PATENT OFFICE.

THOMAS VICARS AND EDWARD LYNTON VICARS, OF EARLESTOWN, ENGLAND.

BISCUIT OR LIKE EMBOSSING AND CUTTING MACHINE.

Application filed January 5, 1921. Serial No. 435,265.

(GRANTED UNDER THE PROVISIONS OF THE ACT OF MARCH 3, 1921, 41 STAT L., 1313.)

*To all whom it may concern:*

Be it known that we, THOMAS VICARS and EDWARD LYNTON VICARS, subjects of the King of England, and residing at Earlestown, in the county of Lancaster, England, have invented Improvements in or Connected with Biscuit or Like Embossing and Cutting Machines (for which I have filed an application in England, June 30, 1919, Patent No. 154851), of which the following is a specification.

This invention has reference to biscuit or like cutting or embossing machines, and more particularly to the main cross head of such machines, as shown in my co-pending application filed December 22, 1920, Serial No. 432,588, which carries the embossing or cutting devices, and is adapted through screw gear thereon operating upon threaded rods which pass through bosses on the cross head, to be adjusted vertically upwards or downwards; and the present invention has for its object and effect to provide improvements in connection with the crosshead and raising and lowering mechanism thereon, by which they are simplified and rendered more symmetrical, and more mechanical and cleanly; so promoting cleanliness in biscuit manufacturing machinery.

According to this invention, the upper or embossing cross head adjusting means, by which it is raised and lowered or adjusted on the vertical rods or bars, by which it is connected to and operated from it operating gear below in the known way, has a shaft with worms upon it, extending centrally across the cross head between two sets of worm wheels mounted on pivots on the top thereof, at each end, and meshing with other wheels of a similar type, having threaded nuts or parts on same through which the said bars or rods pass, so that by rotating these two cross head end mechanisms on each side of and by the said shaft and its worms, the outer nut wheels are revolved, and the cross head raised or lowered as desired.

The nut tooth wheels are mounted in brackets extending out at each side of the ends of the crosshead; and the whole gearing at each end, has fitted over it a hood or cover which is fastened down on to the cross head and brackets. By this construction this part of the machine can be readily dusted, and cleaned by simply sweeping over with a brush, and the goods being manipulated in the machine do not suffer as all flour etc. can be readily brushed away; and also the whole arrangement of cross head arrangement is balanced and symmetrical.

The invention will be further described with reference to the accompanying drawings, in which Figure 1 is a side elevation, Figure 2 a plan, and Figure 3 a cross section.

In the drawings, 1 generally represents the body of the embossing cross head, 2 are the vertical rods or bars which are connected to the cross head operating gear below in the known way. 3 is the shaft extending longitudinally over the cross head, and 4 are the worms upon it. 5 are worm wheels mounted on spindles 6 fixed on the cross head, and with which the worms 4 mesh; and 7 are the tooth wheels similar to 5 having nuts upon them—that is to say their hubs are internally threaded and constitute nuts—through which the threaded rods 2 pass, the hubs of the nut wheels fitting within apertures in the outwardly projecting brackets 8.

The whole of the gearing at each end of the crosshead, is enclosed and covered in by a hood or casing 10, through the roof of which the ends of the rods 2, and the ends of the spindles 6 of the worm wheels 5 pass; whilst the shaft 3 passes through holes in the side walls of the hood or cover.

The shaft 3 is operated by a hand wheel 11 fixed on it, outside the bracket 12, which is fixed on the projecting parts 13 which form the slides on the outer ends of the cross head which slide up and down in the main frames of the machine as usual; the bracket 12 having a split boss 14 on its upper end, through which the shaft 3 passes, and by which it is adapted to be clamped after the gears have been operated and the crosshead adjusted, by means of a clamping screw 15.

The shaft 3 is divided in the centre, and each part has upon it a dog clutch portion 16, the right hand one of which is adapted to be moved longitudinally into and out of engagement with the left hand one or fixed in the ordinary manner of a dog clutch. It is moved out of engagement by means of a lever 17, the lower end of which is a jaw engaging with a grooved pulley portion of the clutch in the known way, and this lever 17 is operated from the left hand end of the machine by a lever 18, pivoted on the screw pin 15, and a connecting bar 29. Thus, by actuating the lever 18 the clutch 16 may be disengaged, the right hand part being moved against this spring 20; and after the lever 18 is released, the spring 20 forces the clutch again into the clutching position.

The hand operated end of the shaft 3 is supported at one part by a bearing 21 fixed on the crosshead, and the end next the clutch of the other portion on this shaft is supported by a bracket 22 on the crosshead, which also forms a resistance support to one end of the spring 20, and carries by a bracket on its upper end, as shown, the lever 17. Thus by this means, it is possible by de-clutching the clutch, and clutching it, to raise or lower either end of the bracket, at will, or to raise or lower both together.

What is claimed is:—

1. In biscuit or like cutting or embossing machines, a cross head at the upper part of the machine for carrying the embossing or cutting devices comprising a shaft having means upon it extending centrally across the cross head between two sets of worm wheels, mounted on pivots in the top thereof at each end, and meshing with wheels of a similar type having threaded nuts or parts on same through which vertical adjusting rods pass, said nut tooth wheels being mounted in brackets extending out at each of the ends of the crosshead, and a cover at each end fitting over the gearing; substantially as set forth.

2. A biscuit cutting or embossing machine, having two pairs of standards, including a crosshead, gears mounted in said crosshead having threaded engagement with the standards for supporting the crosshead on the standards, a pair of shafts mounted on the crosshead having a worm gear on each shaft and a disengageable clutch connection and gear connections from the gears on each pair of standards to one of the worm gears, and means for rotating one of the shafts, whereby when one shaft is rotated independently of the other, the crosshead may be adjusted on its transverse axis and when the clutch is engaged, both shafts rotate together for raising or lowering said crosshead.

In testimony whereof we have signed our names to this specification in the presence of two subscribing witnesses.

THOMAS VICARS.
E. LYNTON VICARS.

Witnesses:
G. PERCIVAL MASON,
WM. JNO. JENKINS.